United States Patent
Lee et al.

(10) Patent No.: US 10,593,950 B2
(45) Date of Patent: Mar. 17, 2020

(54) POSITIVE ELECTRODE FOR METAL AIR BATTERY, METAL AIR BATTERY INCLUDING THE SAME, AND METHOD OF PREPARING THE POSITIVE ELECTRODE FOR METAL AIR BATTERY

(71) Applicant: Samsung Electronics Co., Ltd., Suwon-si, Gyeonggi-do (KR)

(72) Inventors: Hyunpyo Lee, Seoul (KR); Taeyoung Kim, Seoul (KR); Dongjoon Lee, Suwon-si (KR); Heungchan Lee, Seongnam-si (KR); Dongmin Im, Seoul (KR); Wonsung Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/667,753

(22) Filed: Aug. 3, 2017

(65) Prior Publication Data

US 2018/0040898 A1    Feb. 8, 2018

(30) Foreign Application Priority Data

Aug. 8, 2016   (KR) .................. 10-2016-0100881
Jun. 2, 2017   (KR) .................. 10-2017-0069076

(51) Int. Cl.
*H01M 4/62*       (2006.01)
*H01M 10/0565*    (2010.01)
(Continued)

(52) U.S. Cl.
CPC .......... *H01M 4/625* (2013.01); *H01M 4/133* (2013.01); *H01M 4/1393* (2013.01);
(Continued)

(58) Field of Classification Search
CPC .... H01M 4/625; H01M 4/133; H01M 4/1393; H01M 4/583; H01M 4/622; H01M 10/0565; H01M 12/06
See application file for complete search history.

(56) References Cited

U.S. PATENT DOCUMENTS 9,312,583 B2    4/2016   Lee et al.
2010/0009257 A1  1/2010   Kang et al.
(Continued)

FOREIGN PATENT DOCUMENTS

KR    1020140091089 A    7/2014
KR    101463722 B1    11/2014
(Continued)

OTHER PUBLICATIONS

Brist et al., Noncovalent interactions of molecules with single walled carbon nanotubes, Chemical Society Reviews, vol./Issue 35, pp. 637-659 (Year: 2006).*
European Search Report for European Patent Application No. 17180983.3 dated Oct. 6, 2017.

*Primary Examiner* — Jayne L Mershon
(74) *Attorney, Agent, or Firm* — Cantor Colburn LLP (57) ABSTRACT

A positive electrode for a lithium battery includes a lithium salt, a carbonaceous material, and a coating on a surface of the carbonaceous material, the coating including a polymer electrolyte including a hydrophilic material and a hydrophobic material, wherein a portion of the polymer electrolyte is anchored to the surface of the carbonaceous material by a chemical bond.

23 Claims, 7 Drawing Sheets

(51) Int. Cl.
*H01M 12/06* (2006.01)
*H01M 4/583* (2010.01)
*H01M 4/1393* (2010.01)
*H01M 4/133* (2010.01)
*H01M 4/131* (2010.01)
*H01M 4/136* (2010.01)

(52) U.S. Cl.
CPC ........... *H01M 4/583* (2013.01); *H01M 4/622* (2013.01); *H01M 10/0565* (2013.01); *H01M 12/06* (2013.01); *H01M 4/131* (2013.01); *H01M 4/136* (2013.01)

(56) References Cited

U.S. PATENT DOCUMENTS

| | | | |
|---|---|---|---|
| 2011/0111299 A1* | 5/2011 | Liu | B82Y 30/00 |
| | | | 429/221 |
| 2016/0056502 A1* | 2/2016 | Kim | H01M 10/0565 |
| | | | 429/314 |
| 2016/0079590 A1 | 3/2016 | Roev et al. | |
| 2016/0164103 A1 | 6/2016 | Son et al. | |

FOREIGN PATENT DOCUMENTS

| KR | 101530993 B1 | 6/2015 |
|---|---|---|
| KR | 1020160031828 A | 3/2016 |

* cited by examiner

POSITIVE ELECTRODE FOR METAL AIR BATTERY, METAL AIR BATTERY INCLUDING THE SAME, AND METHOD OF PREPARING THE POSITIVE ELECTRODE FOR METAL AIR BATTERY

CROSS-REFERENCE TO RELATED APPLICATIONS

This application claims priority to and the benefit of Korean Patent Application No. 10-2016-0100881, filed on Aug. 8, 2016, and Korean Patent Application No. 10-2017-0069076, filed on Jun. 2, 2017, in the Korean Intellectual Property Office, and all the benefits accruing therefrom under 35 U.S.C. § 119, the contents of which are incorporated herein in their entirety by reference.

BACKGROUND

1. Field

An aspect of the present disclosure relates to a positive electrode for a metal air battery, a metal air battery including the same, and a method of preparing the positive electrode for a metal air battery.

2. Description of the Related Art

A metal air battery, for example, a lithium air battery, generally includes a negative electrode capable of intercalation and deintercalation of lithium ions, a positive electrode (air electrode) in which oxidation and reduction of oxygen occurs using oxygen as an active material, and a separator interposed between the negative electrode and the positive electrode.

A lithium air battery may have a theoretical energy density per unit weight of 3,500 watt hours per kilogram (Wh/kg) or greater, which is about ten times greater than that of a lithium ion battery.

However, there is still a need to develop a positive electrode for a metal air battery, a metal air battery including the same, and a method of preparing the positive electrode for a metal air battery having an improved energy density per unit weight.

SUMMARY

Provided is a positive electrode for a metal air battery including a carbonaceous material having a polymer electrolyte layer coated on a surface thereof and including a polymer electrolyte including at least one hydrophilic material and at least one hydrophobic material.

Provided is a metal air battery including the positive electrode.

Provided is a method of preparing the positive electrode for a metal air battery.

According to an aspect of an example embodiment, a positive electrode for a metal air battery includes a lithium salt, a carbonaceous material, and a coating on a surface of the carbonaceous material, the coating including a polymer electrolyte including a hydrophilic material and a hydrophobic material, wherein a part of the polymer electrolyte is anchored to the surface of the carbonaceous material by a chemical bond.

According to an aspect of another example embodiment, a metal air battery may include a negative electrode including lithium or a lithium alloy, the positive electrode, and a separator disposed between the negative electrode and the positive electrode.

According to an aspect of another example embodiment, a method of preparing a positive electrode for a metal air battery includes combining the carbonaceous material, the polymer electrolyte, a lithium salt, and a solvent, dispersing the carbonaceous material, the polymer electrolyte, and the lithium salt in the solvent to prepare a dispersion, and drying the dispersion.

Additional aspects will be set forth in part in the description which follows and, in part, will be apparent from the description, or may be learned by practice of the presented example embodiments.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Reference will now be made in detail to example embodiments, which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a positive electrode for a metal air battery, a metal air battery including the same, and a method of preparing the positive electrode for a metal air battery according to example embodiments will be described in detail with reference to the drawings.

A metal air battery, for example, a lithium air battery, may include a negative electrode capable of intercalation/deintercalation of lithium ions, a positive electrode using oxygen as an active material, and an electrolyte capable of transporting the lithium ions. The lithium air battery advantageously has a high theoretical energy density per unit weight since oxygen is not stored in the lithium air battery.

In general, a lithium air battery may include an electrolyte to obtain a pathway of lithium ions. However, the energy density per unit weight may decrease when a lithium air battery includes an excess of an electrolyte in comparison with a carbonaceous material of the positive electrode (air electrode).

In order to prevent a decrease in energy density per unit weight, there is therefore a need to develop a positive electrode for a metal air battery having an improved energy density per unit weight.

As an electrolyte, the lithium air battery may include an aqueous electrolyte or a nonaqueous electrolyte. However, the aqueous electrolyte may cause serious corrosion in a lithium air battery due to contact between a lithium negative electrode and the aqueous electrolyte. As a result, extensive research has been conducted into developing improved nonaqueous electrolytes.

Examples of the nonaqueous electrolyte may include an ionic liquid or an organic liquid electrolyte. Examples of the organic liquid electrolyte may include a carbonate, an ether, a sulfone, N,N-dimethylsulfoxide (DMSO), N,N-dimethylacetamide (DMAC), or the like.

The use of the nonaqueous electrolyte as the electrolyte may cause a reaction mechanism represented by Reaction Scheme 1 below.

Reaction Scheme 1

$4Li + O_2 \leftrightarrow 2Li_2O$  $E° = 2.91$ V $2Li + O_2 \leftrightarrow Li_2O_2$  $E° = 3.10$ V During discharge, lithium introduced from the negative electrode reacts with oxygen introduced from the positive electrode (air electrode) to generate lithium oxide and reduce oxygen (oxygen reduction reaction (ORR)). During charge, the lithium oxide is reduced, and oxygen is oxidized to generate oxygen gas (oxygen evolution reaction (OER)). According to Reaction Scheme 1, $Li_2O_2$ is precipitated in pores of the positive electrode (air electrode) during discharge, and a capacity of the lithium air battery increases as a contact area between the electrolyte and the positive electrode (air electrode) increases.

The positive electrode (air electrode) may include a carbonaceous material having a large specific surface area and a large pore volume. However, due to the large pore volume, an increased amount of the electrolyte is used in the metal air battery. When the amount of the electrolyte is greater than the amount of the carbonaceous material, the space for discharge products is occupied by an excess of the electrolyte. As a result, generation of the discharge products is inhibited, and thus a weight of the metal air battery may increase and an energy density per unit weight of the metal air battery may decrease.

The positive electrode for a metal air battery according to an example embodiment includes: a lithium salt; a carbonaceous material; and a coating on a surface of the carbonaceous material, the coating including a polymer electrolyte layer including a polymer electrolyte including at least one type of hydrophilic material and at least one type of hydrophobic material. A portion of the polymer electrolyte may be anchored to the surface of the carbonaceous material via a chemical bond, e.g., a noncovalent bond or a covalent bond.

Throughout the specification, the terms "hydrophilic" and "hydrophobic" are understood as relative concepts.

Throughout the specification, the term "hydrophilic" refers to "hydrophilic properties of a surface of a material, and the term "hydrophobic" refers to hydrophobic properties of a surface of a material." As used herein, the terms "hydrophilic material" and "hydrophobic material" are distinguished from each other based on the wettability of a surface of the material by water. Wettability of the surface of the material by water may be quantitatively analyzed using a contact angle between the material and water.

The term "contact angle with water" refers to an angle between a surface of water and a surface of a material when the water reaches a thermodynamic equilibrium with a surface of the material. For example, the contact angle with water may be acquired by dropping a predetermined volume of water on a substrate coated with a material and measuring a tangent angle of a line between a point of contact between the substrate and the water droplet and a contact point of the surface of the material. For example, the contact angle with water may be theoretically defined by Young's Equation below.

$$\gamma_{lv} \cos \Theta_Y = \gamma_{sv} - \gamma_{sl} \gamma_{lvc} \quad (1)$$

In the equation (1) above, $\gamma_{lv}$, $\gamma_{sv}$, and $\gamma_{sl}$ are, respectively, interfacial tensions between liquid and gaseous phases, solid and gaseous phases, and solid and liquid phases, and $\theta_Y$ is a contact angle.

The contact angle with water may be measured using various known methods such as a Telescope-Goniometer, captive bubble method, tilting plate method, Wilhelmy balance method, capillary tube method, static sessile droplet method, or ACCUDYNE TEST™ kit.

The polymer electrolyte may include a hydrophilic material and a hydrophobic material, each having a contact angle with water, wherein the difference between the contact angle of the hydrophilic material and the contact angle of the hydrophobic material is 5° or greater. The contact angle with water of the hydrophilic material may be about 0° to about 70°. The contact angle with water of the hydrophobic material may be 70° or greater. Unless stated otherwise, the contact angle is determined at 20° C.

The contact angle with water is inversely correlated to the solubility of the material in water. That is, the contact angle with water may decrease as solubility in water increases, and the contact angle with water may increase as solubility in water decreases. Thus, a hydrophilic material has a higher solubility in water than a hydrophobic material.

For example, polyethylene glycol, as a hydrophilic material, having a molecular weight of 4,000 Daltons (Da) is highly soluble in water with a solubility of 66% (w/w) at 20° C. In comparison, for example, polypropylene glycol, as a hydrophobic material, having a molecular weight of 4,000 Da is less soluble in water with a solubility of less than 0.01% (w/w) at 20° C. Thus, for example, for a polyethylene glycol-polypropylene glycol-polyethylene glycol block copolymer, a polypropylene glycol block that is a hydrophobic material having a low solubility in water may be disposed at inner positions of the block copolymer and a polyethylene glycol block that is a hydrophilic material having a relatively high solubility in water may be disposed at outer positions of the block copolymer, in accordance with a concentration of the polymer in a water solution.

The noncovalent bond refers to a relatively weak bond formed between the surface of the carbonaceous material and the polymer electrolyte. The noncovalent bond may be, for example, a hydrogen bond, a Van der Waals bond, a charge transfer, a dipole-dipole interaction, a pi-pi ($\pi$-$\pi$) stacking interaction, or the like. The noncovalent bond may be formed by bonding the polymer electrolyte to the carbonaceous material without altering the surface of the carbonaceous material.

The covalent bond refers to a bond formed by a reaction between a reactive functional group directly attached to the surface of the carbonaceous material and a functional group on the polymer electrolyte. For example, the reactive functional group directly attached to the surface of the carbonaceous material may be—a —COOH group, a —COH group, or a —OH group. For example, the covalent bond may be formed by oxidation, halogenation, cycloaddition, radical addition, thiolation, or the like. For example, the covalent bond may be formed by introducing a reactive functional group such as a carboxyl group (—COOH) on the surface of the carbonaceous material via oxidation by acid treatment, and then forming the covalent bond between the surface of the carbonaceous material and the polymer electrolyte by using a functional group of the polymer electrolyte having an ethylene oxide block having a side chain such as an amino group (—NH$_2$) (e.g., a polyethylene oxide (PEO)-b-polypropylene oxide (PPO)-b-polyethylene oxide (PEO) tri-block copolymer).

The term "anchored" refers to a state in which a material is attached on a surface of a support and a portion of the material attached to the surface is fixed to the surface. The other portions of the material not attached to the surface of the support may be mobilized or unfixed.

Figure 1:
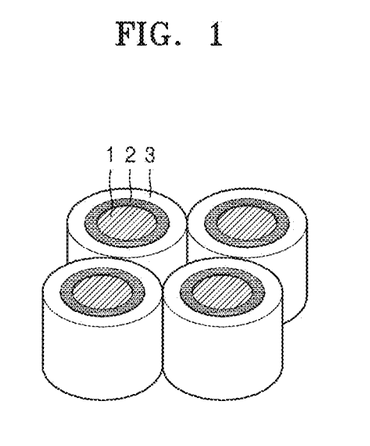
FIG. 1 is a schematic diagram of a structure of a positive electrode in which carbonaceous materials are coated with polymer electrolyte layer according to an example embodiment.

FIG. 1 is a schematic diagram of a structure of a positive electrode in which carbonaceous material are coated with polymer electrolyte layers according to an example embodiment.

Referring to FIG. 1, the positive electrode has a structure in which a polymer electrolyte coating layer is formed on the surface of a carbonaceous material 1. The polymer electrolyte coating layer includes a polymer electrolyte including a hydrophobic material 2 and a hydrophilic material 3. Voids are present among a plurality of the carbonaceous materials 1 respectively having the polymer electrolyte coating layer.

Since the positive electrode for a metal air battery according to an example embodiment includes the polymer electrolyte coating layer including the polymer electrolyte including the at least one type of hydrophilic material and the at least one type of hydrophobic material coated on the surface of the carbonaceous material, an amount of the electrolyte may be reduced. In addition, since a portion of the polymer electrolyte is anchored to the surface of the carbonaceous material, via noncovalent or covalent bonds, the integrity of the polymer electrolyte coating layer may be maintained during repeated charging and discharging of the metal air battery. As a result, the metal air battery may have a reduced weight and an increased energy density per unit weight.

All, or a portion of, the at least one type of hydrophobic material of the polymer electrolyte may be anchored to the surface of the carbonaceous material via noncovalent bonds. Since the surface of the carbonaceous material is hydrophobic, all or a portion of the hydrophobic material of the polymer electrolyte may be easily anchored to the surface of the carbonaceous material due to the high affinity between the carbonaceous material and the hydrophobic material of the polymer electrolyte.

All, or a portion of, the hydrophobic material of the polymer electrolyte may include a hydrophobic repeating unit and/or a hydrophobic functional group.

Examples of the hydrophobic repeating unit may include butyl acrylate, 2-ethylhexyl acrylate, methacrylate, benzyl methacrylate, butyl methacrylate, tert-butyl methacrylate, cyclohexyl methacrylate, 2-ethylhexyl methacrylate, hexadecyl methacrylate, hexyl methacrylate, isobutyl methacrylate, isopropyl methacrylate, methyl methacrylate, octadecyl methacrylate, tetrahydrofurfuryl methacrylate, acrylonitrile, maleic anhydride, styrene, propylene glycol, propylene oxide, butene, 1-decene, dicyclopentadiene, isobutylene, 4-methyl-1-pentene, ethylene, propylene, ethylene adipate, ethylene succinate, ethylene terephthalate, 2-ethyl-1,3-hexanediol sebacate, vinyl acetate, vinyl cinnamate, vinyl stearate, tetrahydrofuran, and any copolymers thereof.

Examples of the hydrophobic functional group may include a hydroxyl group, a methyl group, a carbonyl group, a carboxyl group, an amino group, a phosphate group, a mercapto group, and a combination thereof.

The hydrophobic repeating unit and/or the hydrophobic functional group may be located as a backbone and/or as a side chain of the polymer electrolyte.

All or a portion of the hydrophobic material of the polymer electrolyte included in the polymer electrolyte layer may be adsorbed to the surface of the carbonaceous material, for example, via Van der Waals' interactions. Due to such adsorption, there is no need to induce a reaction between the hydrophobic material and the surface of the carbonaceous material, and thus the surface of the carbonaceous material may be functionalized with the hydrophobic material and retain the intrinsic properties of the carbonaceous material. Therefore, lithium ion conductivity of the metal air battery may be maintained without being reduced.

The polymer electrolyte may include a crosslinked polymer electrolyte. The crosslinked polymer electrolyte may anchor the polymer electrolyte coating layer to the surface of the carbonaceous material more firmly. Thus, the amount of the electrolyte may be considerably reduced. As a result, the metal air battery may have a reduced weight and an increased energy density per unit weight.

For example, the polymer electrolyte of the polymer electrolyte layer may include a block copolymer comprised of a block of the hydrophobic material (i.e., hydrophobic block) and a block of the hydrophilic material (i.e., hydrophilic block).

The hydrophobic block is the same as the hydrophobic repeating unit described above.

Examples of the hydrophilic block may include ethylene glycol, ethylene oxide, N-isopropylacrylamide, 2-oxazoline, 2-ethyl-2-oxazoline, ethyleneimine, sulfopropyl acrylate, 2-hydroxypropyl methacrylate, vinyl alcohol, vinyl pyrrolidone, and any copolymers thereof.

Figure 2:
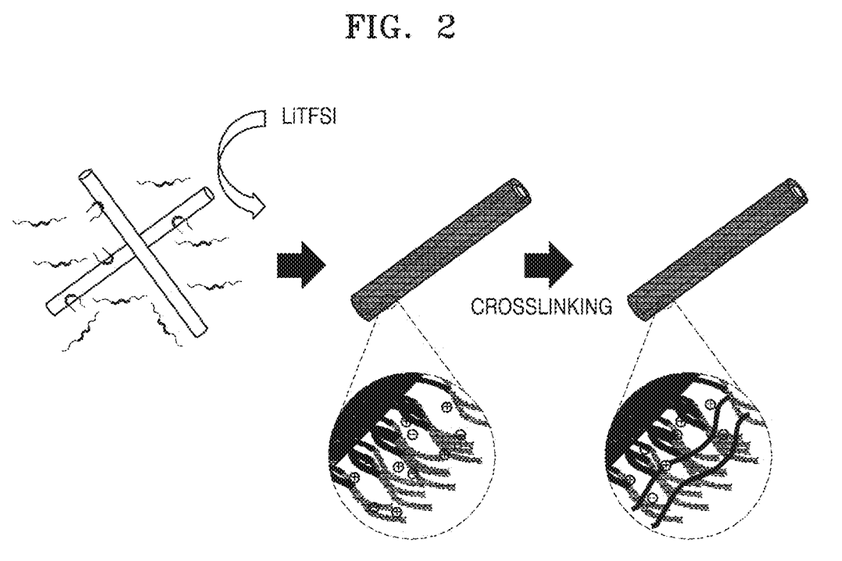
FIG. 2 is a schematic diagram for describing a method of preparing a positive electrode for a metal air battery, according to an example embodiment.

The hydrophobic block of the block copolymer may be anchored to the surface of the carbonaceous material, and the hydrophilic block may be arranged on the surface of the carbonaceous material away from the surface of the carbonaceous material. For example, since the hydrophobic block of the block copolymer is adsorbed to the surface of the carbonaceous material via Van der Waals' interactions, and the hydrophilic block is arranged on the surface of the carbonaceous material away from the surface of the carbonaceous material, lithium ions may be efficiently conducted. An example of this structure is shown in FIGS. 2 and 4B.

For example, the block copolymer may include propylene oxide (or propylene glycol) as an example of the hydrophobic block and ethylene oxide (or ethylene glycol) as an example of the hydrophilic block. This classification of hydrophobic versus hydrophilic is based on the relative concepts previously described above.

In the block copolymer, propylene oxide (or propylene glycol) as a hydrophobic block is adsorbed to the surface of the carbonaceous material via Van der Waals' interactions and ethylene oxide (or ethylene glycol) as a hydrophilic block is arranged outward from the surface of the carbonaceous material. Then, for example, a polymer electrolyte including polyethylene oxide (or polyethylene glycol) crosslinked with adjacent CH. radicals, which are formed from $CH_2$ of the hydrophilic block of ethylene oxide (or ethylene glycol) via ultraviolet (UV) light crosslinking (or thermal crosslinking) using a radical agent such as an UV initiator, as shown in Reaction Scheme 2 below, and polypropylene oxide (or polypropylene glycol) mostly uncrosslinked may be formed.

Reaction Scheme 2

The block copolymer may include two or more different polymerizable monomer blocks. For example, the block copolymer may include two or three different polymerizable monomer blocks.

A number average molecular weight Mn of the hydrophilic block of the block copolymer may be about 500 Da to about 20,000 Da. For example, the number average molecular weight Mn of the hydrophilic block of the block copolymer may be about 500 Da to about 18,000 Da, for example, about 500 Da to about 16,000 Da, for example, about 500 Da to about 14,000 Da, for example, about 500 Da to about 12,000 Da, for example, about 500 Da to about 10,000 Da, for example, about 500 Da to about 9,000 Da, for example, about 500 Da to about 8,000 Da, for example, about 500 Da to about 7,000 Da, for example, about 500 Da to about 6,000 Da, for example, about 500 Da to about 5,000 Da, for example, about 600 Da to about 5,000 Da, for example, about 700 Da to about 5,000 Da, and for example, about 800 Da to about 5,000 Da. If the number average molecular weight Mn of the hydrophilic block of the block copolymer is within these ranges, the hydrophilic blocks do not agglomerate but are dispersed, resulting in improvement of lithium ion conductivity of the metal air battery.

The hydrophilic block may be a polymer block having a lithium ion conductive group as a side chain. The lithium ion conductive group is a hydrophilic group. Examples of the lithium ion conductive group as the side chain may include —$SO_3^-$, —$COO^-$, —$(CF_3SO_2)_2N^-$ (hereinafter, referred to as TFSI anion), —$(FSO_2)_2N^-$ (hereinafter, referred to as FSI anion), —$SO_2N^-SO_2CF_3$, —$SO_2N^-SO_2CF_2CF_3$, —$SO_2C_6H_4COO^-$, —$C_6H_3(SO_2NH_2)COO^-$, —$CH(COO^-)CH_2COO^-$, —$C_6H_3(OH)COO^-$, —$C_6H_2(NO_2)_2COO^-$, or —$CH_2C(CH_3)_2COO^-$.

The polymer block having a lithium ion conductive group as a side chain may be, for example, a polyacrylate block functionalized with TFSI-anion or FSI-anion or a poly(meth)acrylate block functionalized with TFSI-anion or FSI-anion. If the lithium ion conductive group is included as a side chain, lithium ion conductivity may be improved by easily securing the mobility of lithium ions.

The block copolymer may be an uncrosslinked or crosslinked block copolymer.

For example, the block copolymer may include a polyethylene glycol-b-polypropylene glycol diblock copolymer, a polyethylene oxide-b-polypropylene oxide diblock copolymer, a polystyrene-b-polyethylene glycol diblock copolymer, a polystyrene-b-polyethylene oxide diblock copolymer, a polystyrene-b-poly(4-vinyl pyridine) diblock copolymer, a polystyrene-b-poly(meth)acrylate diblock copolymer, a polystyrene-b-poly(meth)acrylate diblock copolymer functionalized with TFSI⁻ anion, a polystyrene-b-poly(meth)acrylate diblock copolymer functionalized with FSI⁻ anion, a polyethylene glycol-b-polypropylene glycol-b-polyethylene glycol triblock copolymer, a polyethylene oxide-b-polypropylene oxide-b-polyethylene oxide triblock copolymer, a polyethylene glycol-b-polystyrene-b-polyethylene glycol triblock copolymer, a polyethylene oxide-b-polystyrene-b-polyethylene oxide triblock copolymer, or a combination thereof.

For example, the block copolymer may include a crosslinked polyethylene glycol-b-polypropylene glycol diblock copolymer, a crosslinked polyethylene oxide-b-polypropylene oxide diblock copolymer, a crosslinked polystyrene-b-polyethylene glycol diblock copolymer, a crosslinked polystyrene-b-polyethylene oxide diblock copolymer, a crosslinked polystyrene-b-poly(meth)acrylate diblock copolymer functionalized with TFSI⁻ anion, a crosslinked polystyrene-b-poly(meth)acrylate diblock copolymer functionalized with FSI⁻ anion, a crosslinked polyethylene glycol-b-polypropylene glycol-b-polyethylene glycol triblock copolymer, a crosslinked polyethylene oxide-b-polypropylene oxide-b-polyethylene oxide triblock copolymer, a crosslinked polyethylene glycol-b-polystyrene-b-polyethylene glycol triblock copolymer, a crosslinked polyethylene oxide-b-polystyrene-b-polyethylene oxide triblock copolymer, or a combination thereof.

For example, the block copolymer may include a crosslinked polyethylene glycol-b-polypropylene glycol diblock copolymer, a crosslinked polyethylene oxide-b-polypropylene oxide diblock copolymer, a crosslinked polystyrene-b-polyethylene glycol diblock copolymer, a crosslinked polystyrene-b-polyethylene oxide diblock copolymer, a crosslinked polyethylene glycol-b-polypropylene glycol-b-polyethylene glycol triblock copolymer, a crosslinked polyethylene oxide-b-polypropylene oxide-b-polyethylene oxide triblock copolymer, a crosslinked polyethylene glycol-b-polystyrene-b-polyethylene glycol triblock copolymer, a crosslinked polyethylene oxide-b-polystyrene-b-polyethylene oxide triblock copolymer, or a combination thereof.

The number average molecular weight Mn of the block copolymer may be about 3,000 Da to about 60,000 Da. For example, the number average molecular weight Mn of the block copolymer may be about 3,000 Da to about 55,000 Da, for example, about 3,000 Da to about 50,000 Da, for example, about 3,000 Da to about 45,000 Da, for example, about 3,000 Da to about 40,000 Da, for example, about 3,000 Da to about 35,000 Da, for example, about 3,000 Da to about 30,000 Da, for example, about 3,000 Da to about 25,000 Da, for example, about 3,000 Da to about 20,000 Da, for example, about 3,500 Da to about 20,000 Da, for example, about 4,000 Da to about 20,000 Da, for example, about 4,500 Da to about 20,000 Da, and for example, about 5,000 Da to about 20,000 Da. If the number average molecular weight Mn of the block copolymer is within these ranges, lithium ion conductivity may be increased with high elasticity and without increasing crystallinity.

An amount of the polymer electrolyte may be about 10 parts by weight to about 300 parts by weight based on 100 parts by weight of the carbonaceous material. If the amount of the polymer electrolyte is within this range, a lithium battery may have sufficient lithium ion conductivity and high energy density per unit weight.

A thickness of the polymer electrolyte layer may be about 1 nanometer (nm) to about 30 nm. For example, the thickness of the polymer electrolyte layer may be about 1 nm to about 28 nm, for example, about 1 nm to about 26 nm, for example, about 1 nm to about 24 nm, for example, about 1 nm to about 22 nm, for example, about 1 nm to about 20 nm, for example, about 1 nm to about 18 nm, for example, about 1 nm to about 16 nm, for example, about 1 nm to about 14 nm, for example, about 1 nm to about 12 nm, and for example, about 1 nm to about 10 nm. When the thickness of the polymer electrolyte layer is within these ranges, sufficient lithium ion conductivity and high energy density per unit weight may be obtained.

The polymer electrolyte layer may be electrochemically stable with respect to lithium in a charge/discharge voltage range of about 1.4 volt (V) to about 4.5 V. For example, the polymer electrolyte layer may be electrochemically stable with respect to lithium in a charge/discharge voltage range of about 1.5 V to about 4.5 V.

The carbonaceous material may have a porous carbon structure. All or a portion of the carbonaceous material may have a porous carbon structure. For example, the porous carbon structure may be mesoporous. The carbonaceous material may have a sufficient specific surface area and may efficiently transport electrons thereon.

For example, the carbonaceous material may include carbon nanotubes, carbon nanoparticles, carbon nanofibers, carbon nanosheets, carbon nanorods, carbon nanobelts, graphene, graphene oxide, carbon aerogel, inverse opal carbon, any mixture thereof, or any composite thereof. For example, the carbonaceous material may be carbon nanotubes, carbon nanoparticles, or any composite thereof. For example, the composite may be a composite in which carbon nanoparticles are disposed on the surface of carbon nanotubes.

For example, the carbonaceous material may be carbon nanotubes. The carbon nanotubes may be single-walled carbon nanotubes (SWCNTs), double-walled carbon nanotubes (DWCNTs), multi-walled carbon nanotubes (MWCNTs), rope carbon nanotubes, or any combination thereof.

The carbonaceous material may be single-walled carbon nanotubes (SWCNTs), double-walled carbon nanotubes (DWCNTs), multi-walled carbon nanotube (MWCNTs), or any combination thereof.

An average aspect ratio (average length/average diameter) of the carbon nanotubes may be about 1 to about 20,000. The average aspect ratio may be measured by any suitable method, for example, using a transmission electron microscope (TEM) image, a high-resolution transmission electron microscope (HR-TEM) image, a scanning electron microscope (SEM) image, or a field-emission scanning electron microscope (FE-SEM) image, and/or a measuring device using dynamic light-scattering. When the average aspect ratio of the carbon nanotubes is within this range, electric charges are quickly transported from the surface of each nanotube to the inside thereof.

An amount of the carbonaceous material may be about 50 parts by weight to about 80 parts by weight based on 100 parts by weight of the positive electrode.

The lithium salt may include at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI and $LiB(C_2O_4)_2$ (lithium bis(oxalato) borate; LiBOB). However, the example embodiment is not limited thereto, and any compound available as the lithium salt may also be used.

An amount of the lithium salt may be about 5 parts by weight to about 60 parts by weight based on 100 parts by weight of the positive electrode. When the amount of the lithium salt within this range, sufficient lithium ion conductivity may be obtained.

A molar ratio of the polymer electrolyte monomers of the polymer electrolyte layer to lithium ions may be about 40:1 to about 3:1. For example, the molar ratio of the polymer electrolyte monomers of the polymer electrolyte layer to lithium ions may be about 20:1 to about 10:1. However, the molar ratio of the polymer electrolyte monomers of the polymer electrolyte layer to lithium ions is not limited thereto so long as lithium ions and/or electrons are efficiently transported during charging and discharging.

The positive electrode may be an air electrode.

A lithium battery according to another example embodiment may be a lithium air battery. The lithium air battery may include: a negative electrode including lithium or a lithium alloy; the positive electrode as described above; and a separator disposed between the negative electrode and the positive electrode.

Figure 3:
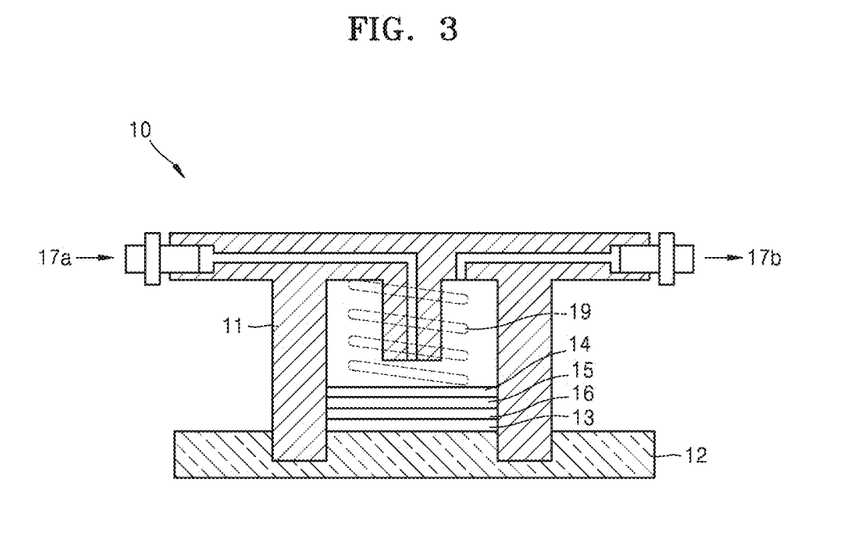
FIG. 3 is a schematic diagram of a structure of a lithium air battery, according to an example embodiment.

FIG. 3 is a schematic diagram illustrating a structure of a lithium air battery 10 according to an example embodiment.

As illustrated in FIG. 3, the lithium air battery 10 includes a positive electrode (air electrode) 15 disposed adjacent to a first current collector 14 and using oxygen as an active material, a negative electrode 13 disposed adjacent to a second current collector 12 and including lithium or a lithium alloy, and a separator 16 interposed between the negative electrode 13 and the positive electrode 15. A lithium ion conductive solid electrolyte membrane (not shown) may further be disposed on the surface of the positive electrode (air electrode) 15 facing the separator 16.

The first current collector 14, which is porous, may also serve as a gas diffusion layer allowing diffusion of air. A pressing member 19 allowing air to reach the positive electrode (air electrode) 15 may further be disposed on the first current collector 14. A case 11 comprised of an insulating resin material is disposed between the positive electrode (air electrode) 15 and the negative electrode 13 to electrically separate the air electrode from the negative electrode. Air is supplied through an air inlet 17a and discharged through an air outlet 17b. The lithium air battery 10 may be stored in a stainless steel reactor (not shown).

The positive electrode (air electrode) 15 includes the lithium salt and the carbonaceous material having a polymer electrolyte layer coated on a surface of the carbonaceous material and including a polymer electrolyte comprised of at least one type of hydrophilic material and at least one type of hydrophobic material. A portion of the polymer electrolyte may be anchored to the surface of the carbonaceous material via a noncovalent bond or a covalent bond.

The lithium salt, the polymer electrolyte, the polymer electrolyte layer, the carbonaceous material, and the anchored state of the polymer electrolyte via a noncovalent or a covalent bond are as described above, and thus a further description thereof will not be given.

The positive electrode (air electrode) 15 may further include an oxygen oxidizing/reducing catalyst. Examples of the oxygen oxidizing/reducing catalyst may include a noble metal catalyst such as platinum (Pt), gold (Au), silver (Ag), palladium (Pd), ruthenium (Ru), rhodium (Rh), and osmium (Os), an oxide catalyst such as manganese oxide, iron oxide, cobalt oxide, and nickel oxide, or an organometallic catalyst such as cobalt phthalocyanine, without being limited thereto. Any other catalyst suitable for as an oxygen oxidizing/reducing catalyst in the art may also be used.

The positive electrode (air electrode) 15 may further include a binder. The binder may include a thermoplastic resin or a thermosetting resin. Examples of the binder may include polyethylene, polypropylene, polytetrafluoroethylene (PTFE), polyvinylidene difluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, each of which may be used alone or in combination with each other, without being limited thereto. Any material available as a binder in the art may also be used.

The second current collector 12 may be any current collector having electrical conductivity, without limitation. For example, stainless steel, nickel (Ni), copper (Cu), aluminum (Al), iron (Fe), titanium (Ti), carbon (C), or the like may be used. The second current collector 12 may have the form of a thin film, a plate, a mesh, and a grid. For example, the second current collector 12 may include a copper foil. The second current collector 12 may be fixed to a Teflon case (not shown).

The negative electrode 13 may include lithium or a lithium alloy. If desired, the negative electrode 13 may include a lithium intercalation compound. However, the negative electrode 13 is not limited thereto, and any lithium-containing material or any compound capable of intercalation and deintercalation of lithium may also be used as the negative electrode 13. Examples of the lithium alloy may include an alloy of lithium and aluminum, tin, magnesium, indium, calcium, titanium, vanadium, or a combination thereof. The negative electrode 13 determining capacity of the lithium air battery may be a lithium thin film.

If desired, the negative electrode 13 may further include a binder. For example, the binder may be polyvinylidene fluoride (PVdF) or polytetrafluoroethylene (PTFE). An amount of the binder may be 30 parts by weight or less, for example, about 1 to about 10 parts by weight, based on 100 parts by weight of the negative electrode 13, without being limited thereto.

The separator 16 may have varying compositions when used in the lithium air battery 10. For example, the separator 16 may be a polymer non-woven fabric such as a polypropylene non-woven fabric or a polyphenylene sulfide non-woven fabric, or a porous film of an olefin resin such as polyethylene or polypropylene, used alone or as a combination thereof.

A lithium ion conductive solid electrolyte membrane may further be disposed on the surface of the positive electrode (air electrode) 15 or the negative electrode 13. For example, the lithium ion conductive solid electrolyte membrane may serve as a protective layer to prevent direct reaction between impurities included in the electrolyte, such as water and oxygen, and lithium included in the negative electrode 13. Examples of the lithium ion conductive solid electrolyte membrane may include an inorganic material such as lithium ion conductive glass, lithium ion conductive crystalline material (e.g., ceramic or glass-ceramic), an inorganic material, or any mixture thereof. However, the lithium ion conductive solid electrolyte membrane is not limited thereto, and any solid electrolyte membrane having lithium ion conductivity and capable of protecting the positive electrode (air electrode) 15 or the negative electrode 13 may also be used. Meanwhile, in consideration of chemical stability, the lithium ion conductive solid electrolyte membrane may be an oxide.

Examples of the lithium ion conductive crystalline may be $Li_{1+x+y}(Al, Ga)_x(Ti, Ge)_{2-x}Si_yP_{3-y}O_{12}$ (where $0 \leq x \leq 1$ and $0 \leq y \leq 1$, for example, $0 \leq x \leq 0.4$ and $0 < y \leq 0.6$ or $0.1 \leq x \leq 0.3$ and $0.1 < y \leq 0.4$). Examples of the lithium ion conductive glass-ceramic may include lithium-aluminum-germanium-phosphate (LAGP), lithium-aluminum-titanium-phosphate (LATP), and lithium-aluminum-titanium-silicon-phosphate (LATSP). Also, the lithium ion conductive solid electrolyte membrane may further include an inorganic solid electrolyte, if desired. Examples of the inorganic solid electrolyte may include $Cu_3N$, $Li_3N$, and LiPON. The lithium ion conductive solid electrolyte membrane may be a single-layer or multi-layer membrane.

The lithium air battery 10 may be prepared as follows.

First, the aforementioned positive electrode (air electrode) 15); the negative electrode 13 including lithium or a lithium alloy; and the separator 16 are prepared.

Next, the negative electrode 13 is mounted on one side of a case 11, the separator 16 is mounted on the negative electrode 13, and the positive electrode (air electrode) 15 on which the lithium ion conductive solid electrolyte membrane is disposed, is mounted on the opposite side of the case 11 to face the negative electrode 13. Subsequently, the first current collector 14 is disposed on the positive electrode (air electrode) 15, and the pressing member 19 allowing air to reach the positive electrode (air electrode) 15 is pressed to fix a cell, thereby completing preparation of the lithium air battery 10.

If desired, a small amount of a liquid electrolyte including a lithium salt may be injected into the separator mounted on the negative electrode during preparation of the battery. For example, the separator may be impregnated with a 1.0 molar (M) lithium trifluoromethane sulfonimide (LiTFSI) propylene carbonate electrolytic solution, but is not limited thereto, and the separator may include an aprotic organic solvent and a lithium salt, or an ionic liquid and a lithium salt in small amounts.

Examples of the aprotic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, α-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethylene glycol, dimethylether, or any mixture thereof.

Examples of the ionic liquid may include diethyl methyl (2-methoxyethyl)ammonium bis(trifluoromethane sulfonyl) imide (DEME-TFSi).

For example, the ionic liquid may be a polymeric ionic liquid. The polymeric ionic liquid may include a repeating unit including: i) at least one cation including ammonium, pyrolidium, pyridinium, pyrimidium, imidazolium, piperidinium, pyrazolium, oxazolium, pyrazinium, phosphonium, sulfonium, triazolium, or any mixture thereof, and ii) at least one anion including $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^{2-}$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $SF_5)_3C^-$, $(O(CF_3)_2C_2(CF_3)_2O)_2PO^-$, $(CF_3SO_2)_2N^-$, or any mixture thereof.

The case may be divided into a lower portion contacting the negative electrode and an upper portion contacting the air electrode. An insulating resin may be interposed between the upper and lower portions to electrically insulate the air electrode and the negative electrode from each other.

There is no need to further dispose the lithium ion conductive polymer electrolyte between the negative electrode 13 and the positive electrode (air electrode) 15. Thus, the total weight of the lithium air battery may be reduced, thereby improving energy density per unit weight.

The lithium air battery may be either a lithium primary battery or a lithium secondary battery. The lithium air battery may be any of various forms, and for example, may be in the form of a coin, a button, a sheet, a stack, a cylinder, a plane, or a horn, without limitation. Also, the lithium air battery may be applied to a large battery for electric vehicles.

The term "air" used herein is not limited to atmospheric air, and may also refer to a combination of gases including oxygen or pure oxygen gas. This broad definition of "air" also applies to other terms, including an air battery, air positive electrode, and the like.

A method of preparing a positive electrode for a metal air battery according to another example embodiment may include preparing the positive electrode including the carbonaceous material and a coating on a surface of the carbonaceous material, the coating including the polymer electrolyte layer including the polymer electrolyte comprised of at least one type of hydrophilic material and at least one type of hydrophobic material. The preparing of the positive electrode includes adding the carbonaceous material, the polymer electrolyte, and the lithium salt to a solvent, dispersing the carbonaceous material, the polymer electrolyte, and the lithium salt in the solvent to prepare a dispersion, and drying the dispersion.

The carbonaceous material, the polymer electrolyte, and lithium salt are as described above, and thus further descriptions thereof will not be given.

For example, the solvent may include water, alcohol, acetone, tetrahydrofuran, cyclohexane, carbon tetrachloride, chloroform, methylene chloride, dimethyl formamide, dimethylacetamide, dimethyl sulfoxide, N-methylpyrolidone, or a combination thereof.

FIG. 2 is a schematic diagram describing a method of preparing a positive electrode for a metal air battery according to an example embodiment.

A carbonaceous material and a polymer electrolyte are added to a solvent in an appropriate weight ratio to obtain a mixture. A lithium salt (e.g., LiTFSI) is added thereto and dispersed in an appropriate molar ratio of polymer electrolyte monomers to lithium ions. Then, the resulting dispersion may be filtered before being dried. A filtering process may be performed using a filter including pores having a pore diameter of 1 micrometer (μm) or less. For example, the filtering process may be performed using a PVdF membrane. Through this process, a carbonaceous material including the lithium salt and having a polymer electrolyte coating layer on the surface thereof may be obtained.

The method may further include a crosslinking process after adding the carbonaceous material, the polymer electrolyte, and the lithium salt to the solvent, dispersing the mixture, and drying the dispersion.

The crosslinking process may be a thermal crosslinking process or an ultraviolet (UV) crosslinking process. If desired, a crosslinking agent may be used in the thermal crosslinking process, and a UV initiator may be used in the UV crosslinking process.

For example, the crosslinking agent may be a polyhydric alcohol or a polyvalent epoxy compound. Examples of the polyhydric alcohol may include an aliphatic polyhydric alcohol such as ethylene glycol, glycerin, and polyvinyl alcohol, and an aromatic polyhydric alcohol such as pyrocatechol, resorcinol and hydroquinone. Examples of the polyvalent epoxy compound may include an aliphatic polyvalent epoxy compound such as glyceryl polyglycidyl ether and trimethylolpropane polyglycidyl ether, and an aromatic polyvalent epoxy compound such as a bisphenol A-type epoxy compound. However, the crosslinking agent is not limited thereto, and any suitable crosslinking agent may be used. By using the crosslinking agent, crosslinking density may be easily adjusted and the polymer electrolyte layer including the polymer electrolyte may be efficiently anchored to the surface of the carbonaceous material.

An amount of the crosslinking agent may be about 1% to about 40% by weight based on a total weight of polymerizable monomers of the polymer electrolyte.

The thermal crosslinking may be performed under atmospheric conditions or oxidation conditions at a temperature of about 80° C. to about 120° C. for about 2 hours to about 6 hours.

The UV initiator may be any material capable of generating free radicals upon exposure to UV light, without limitation. For example, the UV initiator may have a double bond. The carbonaceous material having the polymer electrolyte coating layer on the surface thereof may be exposed to UV light for about 20 minutes to about 60 minutes using a UV irradiator to perform UV crosslinking.

Then, the unreacted crosslinking agent or the unreacted UV initiator are removed from the vacuum oven to prepare a positive electrode for a metal air battery.

Hereinafter, one or more example embodiments of the present disclosure will be described in detail with reference to the following examples and comparative examples. These examples and comparative examples are not intended to limit the purpose and scope of the one or more example embodiments of the present inventive concept.

EXAMPLES

Example 1: Preparation of Carbonaceous Material Coated with Polymer Electrolyte Layer 50 mg of multi-walled carbon nanotubes (Hanwha Chemical, CM250, 92-96% purity) and 200 mg of a polyethylene glycol-b-polypropylene glycol-b-polyethylene glycol triblock copolymer (Sigma Aldrich, Pluronic P-123, average Mn: 5800 Da, ethylene oxide:propylene oxide: ethylene oxide (EO:PO:EO) feed ratio=20:70:20, PEG: 30% by weight), as a polymer electrolyte, were added to 100 mL of water to prepare a mixture.

Lithium bis(trifluoromethanesulfonyl)imide (LiTFSI) powder was added to the mixture such that a molar ratio of EO/Li was 20:1 and the mixture was dispersed using a sonicator for 2 hours. A predetermined amount of the dispersion was filtered using a Whatman® PVdF membrane (pore size: 0.2 μm) to prepare multi-walled carbon nanotubes coated with the polymer electrolyte layer including the PEG-b-PPG-b-PEG triblock copolymer polymer electrolyte.

The resultant was dried at room temperature for 12 hours and in a vacuum oven for 12 hours. Then, the dried resultant was impregnated with an excess of a UV initiator, Luperox® 104, to perform UV crosslinking. The unreacted Luperox® 104 UV initiator was removed from the vacuum oven to prepare multi-walled carbon nanotubes coated with a polymer electrolyte layer comprised of the crosslinked PEG-b-PPG-b-PEG triblock copolymer polymer electrolyte.

Example 2: Preparation of Carbonaceous Material Coated with Polymer Electrolyte Layer Multi-walled carbon nanotubes coated with a polymer electrolyte layer were prepared in the same manner as in described Example 1 except that a polyethylene glycol-b-polypropylene glycol-b-polyethylene glycol triblock copolymer (Sigma Aldrich, Pluronic F-127, average Mn: 12,100 Da, EO:PO:EO=101:56:101 feed ratio, PEG: 73.5% by weight) was used as the polymer electrolyte instead of the polyethylene glycol-b-polypropylene glycol-b-polyethylene glycol triblock copolymer (Sigma Aldrich, Pluronic P-123, average Mn: 5800 Da, EO:PO:EO feed ratio=20:70:20, PEG: 30% by weight).

Example 3: Preparation of Lithium Air Battery

A separator (Celgard 3501) was disposed on a lithium metal thin film negative electrode.

0.1 mL of an electrolyte prepared by dissolving 1 M lithium bis(trifluoromethanesulfonyl)imide (LiTFSI) in poly (ethylene glycol)-dimethylether (Sigma Aldrich, Mw: 500 Da) was injected into the separator.

As a solid electrolyte, a lithium-aluminum titanium phosphate (LATP, thickness: 250 µm, Ohara Corp., Japan) was disposed on the separator.

Then, the multi-walled carbon nanotubes coated with the polymer electrolyte layer comprised of the crosslinked PEG-b-PPG-b-PEG triblock copolymer polymer electrolyte and prepared according to Example 1, was disposed on the LATP solid electrolyte as a positive electrode (air electrode). In this case, the amount of the multi-walled carbon nanotubes coated with the polymer electrolyte layer was 90.5 parts by weight and the amount of the lithium salt was 9.5 parts by weight based on 100 parts by weight of the air electrode.

Then, a gas diffusion layer (GDL, SGL, 25BC) was attached to the upper surface of the positive electrode, a nickel mesh was disposed on the gas diffusion layer, and a pressing member allowing air to reach the positive electrode was applied thereto to fix a cell, thereby completing preparation of a lithium air battery.

A structure of the lithium air battery according to an example embodiment is illustrated in FIG. 3.

Example 4: Preparation of Lithium Air Battery

A lithium air battery was prepared in the same manner as described in Example 3, except that the multi-walled carbon nanotubes coated with the polymer electrolyte layer prepared according to Example 2 was used as the positive electrode (air electrode) instead of the multi-walled carbon nanotubes coated with the polymer electrolyte layer prepared according to Example 1.

Comparative Example 1: Preparation of Lithium Air Battery (1) Preparation of Positive Electrode (Air Electrode)

An electrolyte was prepared by mixing polyethylene oxide (average Mn: 100,000 Da, Aldrich), as an ion conductive polymer, with LiTFSI, as a lithium salt, on a hot plate such that a molar ratio of EO/Li was 20. Multi-walled carbon nanotubes (Hanwha Chemical, CM250, 92-96%) were added to the electrolyte such that a weight ratio of the electrolyte to the multi-walled carbon nanotubes was 3:1, and then mixed to prepare a positive electrode (air electrode) slurry.

The air electrode slurry was coated on a LATP solid electrolyte layer (thickness: 250 µm, Ohara Corp., Japan) such that an amount of the air electrode slurry used to prepare a positive electrode (air electrode) was 3.248 mg/cm$^2$ (about an area of 1 cm×1 cm).

(2) Preparation of Lithium Air Battery

A lithium air battery was prepared in the same manner as in Example 3, except that the positive electrode (air electrode) prepared according to preparation (1) above was used as a positive electrode instead of the multi-walled carbon nanotubes coated with the polymer electrolyte layer prepared according to Example 1.

Analysis Example 1: TEM Analysis—Morphology Analysis

The carbonaceous materials coated with the polymer electrolyte layers respectively prepared according to Examples 1 and 2 were analyzed using TEM images. The TEM analysis was performed using a Titan Cubed G2 60-300 microscope manufactured by FEI. The results are shown in FIGS. 4A to 4C.

Figure 4A:
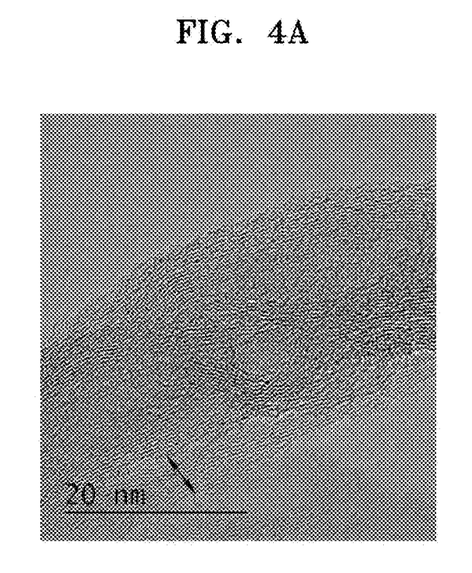
FIG. 4A is a transmission electron microscope (TEM) image of a carbonaceous material coated with a polymer electrolyte layer, prepared according to Example 1.
Figure 4B:
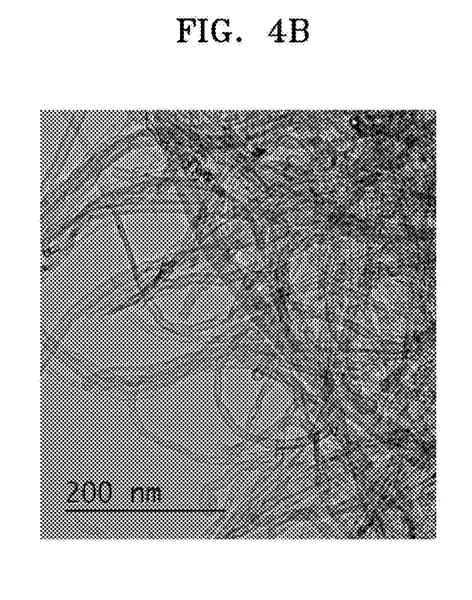
FIGS. 4B and 4C are TEM images of a carbonaceous material coated with a polymer electrolyte layer, prepared according to Example 2.
Figure 4C:
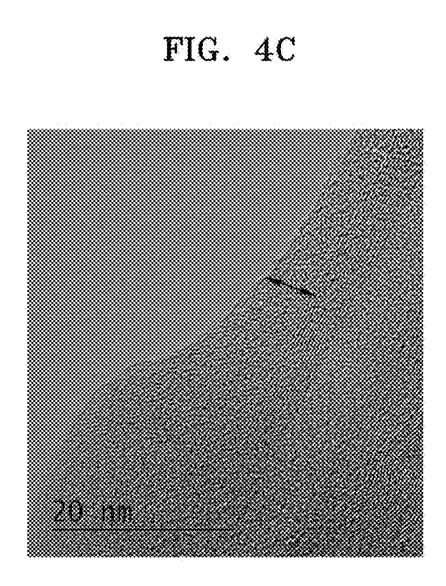

FIGS. 4A and 4C are TEM images of the carbonaceous materials coated with the polymer electrolyte layers prepared according to Examples 1 and 2. FIG. 4B is a TEM image of the carbonaceous material coated with the polymer electrolyte layer prepared according to Example 2.

Referring to FIGS. 4A and 4C, it was confirmed that the polymer electrolyte layers prepared according to Examples 1 and 2 were formed on the surfaces of the carbonaceous materials at thicknesses of about 2 nm, and about 5 nm to about 10 nm, respectively (bidirectional arrows).

Referring to FIG. 4B, it was confirmed that all or a portion of the polymer electrolyte of the polymer electrolyte layer was anchored to and crosslinked with the surface of the carbonaceous material of Example 2. The anchoring was facilitates via noncovalent and/or covalent bonds.

Analysis Example 2: TGA—Weight Reduction Rate of Polymer Electrolyte

The polymer electrolyte layer of the carbonaceous material coated with the polymer electrolyte layer prepared according to Example 1 was analyzed and identified by thermal gravimetric analysis (TGA).

The TGA was performed by measuring, using a thermogravimetric analyzer (Q5000 manufactured by TA Instruments), weight loss of 10 mg of a sample of the carbonaceous material while its temperature increased from 0° C. to 800° C. at a rate of 10° C./min in a nitrogen atmosphere. The results are shown in FIG. 5.

Figure 5:
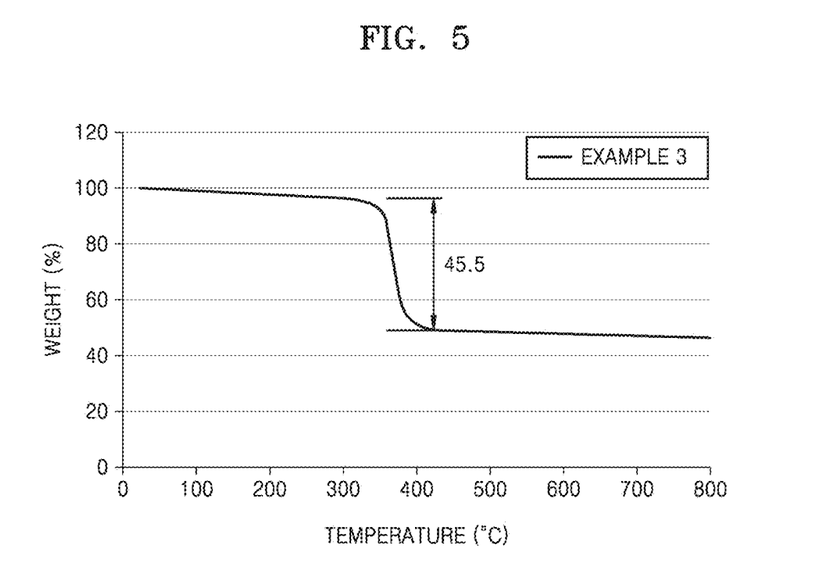
FIG. 5 is a graph of weight (percentage, %) versus temperature (degrees Celsius, ° C.) showing the thermal gravimetric analysis (TGA) graph of a polymer electrolyte layer of the carbonaceous material coated with the polymer electrolyte layer, prepared according to Example 1.

Referring to FIG. 5, weight reduction of the polymer electrolyte started at about 330° C. and stopped at about 400° C. It was confirmed that the level of weight reduction of the polymer electrolyte was about 45.5%.

Analysis Example 3: XPS Analysis—Analysis of Polymer Electrolyte Layer on Surface of Carbonaceous Material The carbonaceous material coated with the polymer electrolyte layer prepared according to Example 2 was analyzed by X-ray Photoelectron Spectroscopy (XPS) to identify the polymer electrolyte of the polymer electrolyte layer. The results are shown in FIGS. 6A and 6B.

The XPS was performed using an appropriate amount of a sample of the carbonaceous material using an X-ray photoelectron spectrometer (PHI, Versaprobe).

Figure 6A:
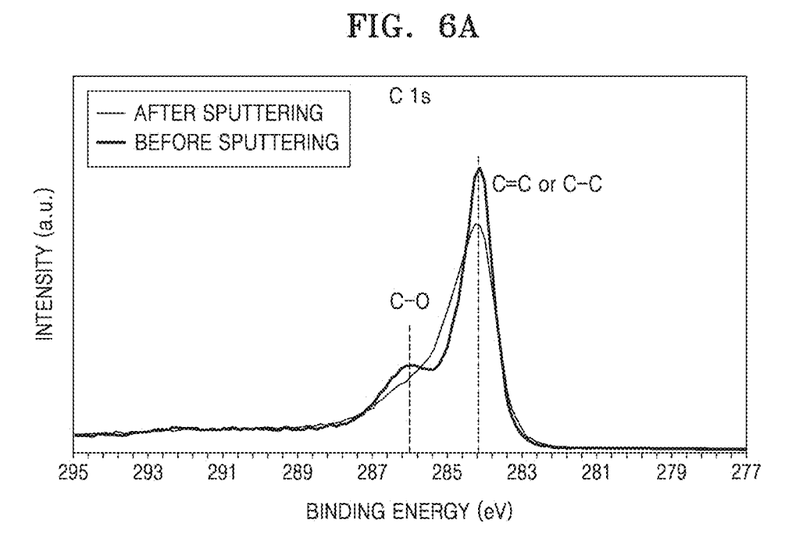
FIGS. 6A and 6B are graphs of intensity (arbitrary units, a.u.) versus binding energy (electron volts, eV) showing, respectively, a C1s spectrum and an O1s spectrum obtained by X-ray photoelectron spectroscopy (XPS) of a carbonaceous material coated with a polymer electrolyte layer, prepared according to Example 2.

Referring to FIG. 6A, C—O bonds were observed in the polymer electrolyte coated on the surface of the carbonaceous material and C—C bonds and C=C bonds were observed between the carbonaceous material and the polymer electrolyte. After sputtering for 2 minutes, the surface of the carbonaceous material was pulverized and observed by XPS. The result showed a peak corresponding to the C—O bonds was reduced.

Figure 6B:
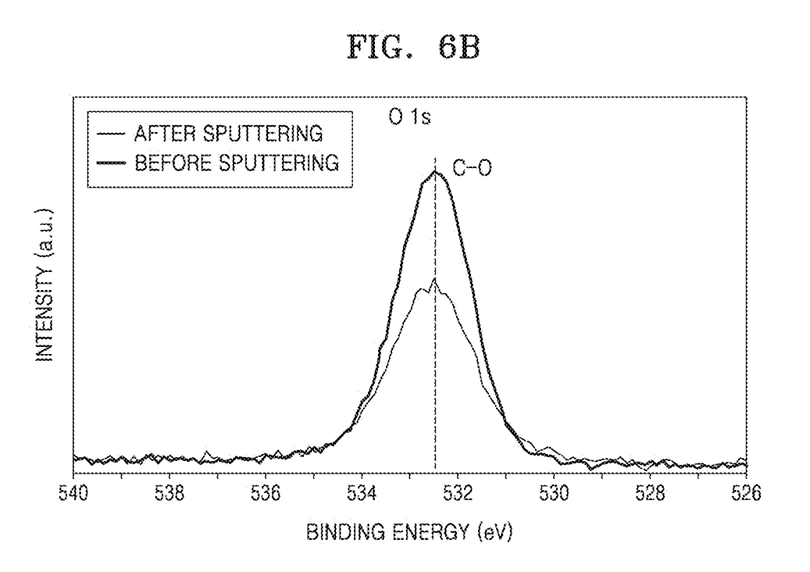

Referring to FIG. 6B, a decrease in the peak corresponding to the C—O bonds was observed after sputtering for 2 minutes. Thus, it was identified that the polymer electrolyte is coated on the surface of the carbonaceous material.

Evaluation Example 1: Evaluation of Charge and Discharge Characteristics—Evaluation of Energy Density The lithium air batteries prepared according to Example 3 and Comparative Example 1 were discharged at a constant current of 0.048 mA/cm$^2$ at 60° C. and at 1 atm in an oxygen atmosphere until a voltage reached 2.0 V (vs. Li) and charged at the same current until the voltage reached 4.3 V; charging was performed at this voltage until the charging current reached 0.0048 mA/cm². The part of results of charging and discharging tests at a first cycle are shown in Table 1 and FIG. 7A.

Also, the lithium air batteries prepared according to Example 4 and Comparative Example 1 were discharged at a constant current of 0.048 mA/cm² at 60° C. and at 1 atm in an oxygen atmosphere until a voltage reached 2.0 V (vs. Li) and charged at the same current until the voltage reached 4.3 V; charging was performed at this voltage until the charging current reached 0.0048 mA/cm². The part of results of charging and discharging tests at a first cycle are shown in Table 2 and FIG. 7B.

In the energy density per unit weight, the unit weight is a total weight of the positive electrode including the electrolyte, the carbonaceous material (coated with the polymer electrolyte layer), and the discharge products, and the energy density is obtained by dividing a product of a discharge amount and an average discharge voltage by the weight.

TABLE 1

|  | Weight of carbon (mg) | Weight of electrolyte (mg) | Discharge amount (mAh) | Energy density (Wh/kg) |
| --- | --- | --- | --- | --- |
| Example 3 | 0.40645 | 0.33255 | 0.43 | 190.18 |
| Comparative Example 1 | 0.406 | 1.218 | 0.43 | 145.81 |

TABLE 2

|  | Weight of carbon (mg) | Weight of electrolyte (mg) | Discharge amount (mAh) | Energy density (Wh/kg) |
| --- | --- | --- | --- | --- |
| Example 4 | 1.03 | 0.499 | 0.54 | 237.12 |
| Comparative Example 1 | 1.03 | 3.10 | 0.54 | 164.97 |

Figure 7A:
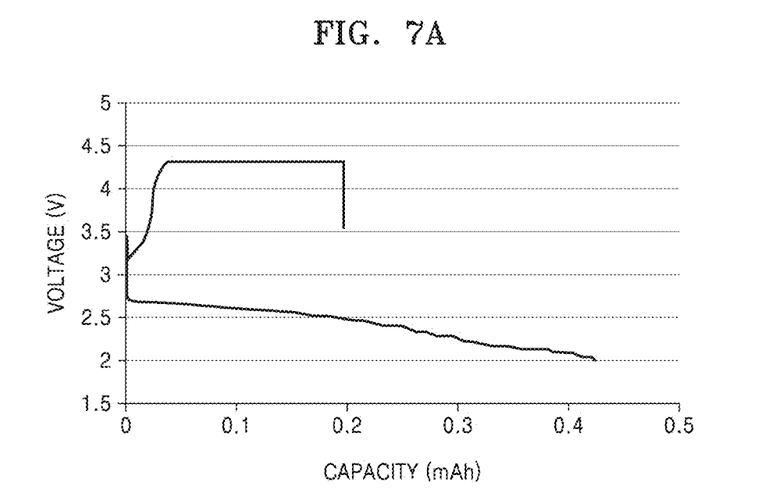
FIGS. 7A and 7B are graphs of voltage (V) versus capacity (milliampere hours, mAh) of the first discharge cycle of a lithium air battery prepared according to Examples 3 and 4.
Figure 7B:
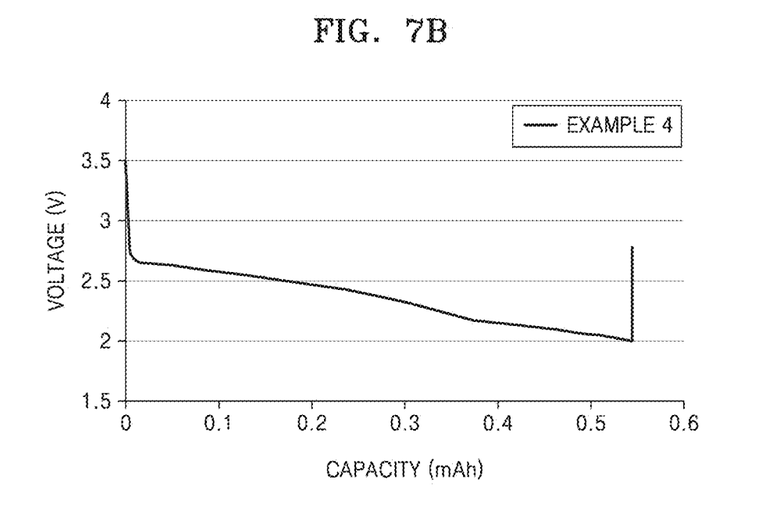

Referring to Table 1 and FIG. 7A, energy density of the lithium air battery prepared according to Example 3 was higher than that of the lithium air battery prepared according to Comparative Example 1 by about 44 Wh/kg. Referring to Table 2 and FIG. 7B, energy density of the lithium air battery prepared according to Example 4 was higher than that of the Comparative Example 1 by 72 Wh/kg. These results are a consequence of the weight of the electrolyte being reduced in the positive electrode (air electrode) of the lithium air battery.

The positive electrode for a metal air battery according to an example embodiment includes the lithium salt, the carbonaceous material, and a coating on a surface of the carbonaceous material, the coating including the polymer electrolyte coating layer including the polymer electrolyte including at least one type of hydrophilic material and at least one type of hydrophobic material. Since a portion of the polymer electrolyte is anchored to the surface of the carbonaceous material via a noncovalent and/or covalent bond, an amount of the electrolyte may be reduced. The metal air battery including the positive electrode for a metal air battery may have increased energy density per unit weight.

It should be understood that example embodiments described herein should be considered in a descriptive sense only and not for purposes of limitation. Descriptions of features or aspects within each example embodiment may be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A positive electrode for a metal air battery, the positive electrode comprising:
   a lithium salt;
   a carbonaceous material; and
   a coating on a surface of the carbonaceous material, the coating comprising a polymer electrolyte comprising a hydrophilic material and a hydrophobic material,
   wherein a portion of the polymer electrolyte is anchored to the surface of the carbonaceous material by a chemical bond, and
   wherein the polymer electrolyte comprises a block copolymer comprising a hydrophobic block comprising the hydrophobic material and a hydrophilic block comprising the hydrophilic material, and
   wherein the hydrophilic block is a polymer block having a lithium ion conductive group as a side chain and the polymer block having a lithium ion conductive group as a side chain is a polyacrylate block functionalized with —(CF$_3$SO$_2$)$_2$N$^-$, or —(FSO$_2$)$_2$N$^-$, or a polymethacrylate block functionalized with —(CF$_3$SO$_2$)$_2$N$^-$ or —(FSO$_2$)$_2$N$^-$—.

2. The positive electrode of claim 1, wherein a difference between a contact angle with water of the hydrophilic material and a contact angle with water of the hydrophobic material is 5° or greater.

3. The positive electrode of claim 2, wherein the contact angle with water of the hydrophilic material is about 0° to 70°.

4. The positive electrode of claim 2, wherein the contact angle with water of the hydrophobic material is 70° or greater.

5. The positive electrode of claim 1, wherein all or a portion of the hydrophobic material of the polymer electrolyte is anchored to the surface of the carbonaceous material via a noncovalent bond.

6. The positive electrode of claim 1, wherein all or a portion of the hydrophobic material of the polymer electrolyte is adsorbed to the surface of the carbonaceous material via a Van der Waals' interaction.

7. The positive electrode of claim 1, wherein the polymer electrolyte comprises a crosslinked polymer electrolyte.

8. The positive electrode of claim 1, wherein the hydrophobic block of the block copolymer is anchored to the surface of the carbonaceous material, and the hydrophilic block is disposed on the surface of and separated from the carbonaceous material.

9. The positive electrode of claim 1, wherein the block copolymer comprises at least two different monomer blocks.

10. The positive electrode of claim 1, wherein the hydrophilic block of the block copolymer has a number average molecular weight of about 500 Daltons to about 20,000 Daltons.

11. The positive electrode of claim 1, wherein the block copolymer comprises a polyethylene glycol-b-polypropylene glycol diblock copolymer, a polyethylene oxide-b-polypropylene oxide diblock copolymer, a polystyrene-b-polyethylene glycol diblock copolymer, a polystyrene-b-polyethylene oxide diblock copolymer, a polystyrene-b-poly (4-vinylpyridine) diblock copolymer, a polystyrene-b-poly (meth)acrylate diblock copolymer, a polystyrene-b-poly(meth)acrylate diblock copolymer functionalized with TFSI⁻ anion, a polystyrene-b-poly(meth)acrylate diblock copolymer functionalized with FSI⁻ anion, a polyethylene glycol-b-polypropylene glycol-b-polyethylene glycol triblock copolymer, a polyethylene oxide-b-polypropylene oxide-b-polyethylene oxide triblock copolymer, a polyethylene glycol-b-polystyrene-b-polyethylene glycol triblock copolymer, a polyethylene oxide-b-polystyrene-b-polyethylene oxide triblock copolymer, or a combination thereof.

12. The positive electrode of claim 1, wherein the block copolymer comprises a crosslinked polyethylene glycol-b-polypropylene glycol diblock copolymer, a crosslinked polyethylene oxide-b-polypropylene oxide diblock copolymer, a crosslinked polystyrene-b-polyethylene glycol diblock copolymer, a crosslinked polystyrene-b-polyethylene oxide diblock copolymer, a crosslinked polystyrene-b-poly(meth)acrylate diblock copolymer functionalized with TFSI⁻ anion, a crosslinked polystyrene-b-poly(meth)acrylate diblock copolymer functionalized with FSI⁻ anion, a crosslinked polyethylene glycol-b-polypropylene glycol-b-polyethylene glycol triblock copolymer, a crosslinked polyethylene oxide-b-polypropylene oxide-b-polyethylene oxide triblock copolymer, a crosslinked polyethylene glycol-b-polystyrene-b-polyethylene glycol triblock copolymer, a crosslinked polyethylene oxide-b-polystyrene-b-polyethylene oxide triblock copolymer, or a combination thereof.

13. The positive electrode of claim 1, wherein the block copolymer has a number average molecular weight of about 3,000 Daltons to about 60,000 Daltons.

14. The positive electrode of claim 1, wherein an amount of the polymer electrolyte is about 10 parts by weight to about 300 parts by weight based on 100 parts by weight of the carbonaceous material.

15. The positive electrode of claim 1, wherein the polymer electrolyte layer has thickness of about 1 nanometer to about 30 nanometers.

16. The positive electrode of claim 1, wherein the polymer electrolyte layer is electrochemically stable with respect to lithium in a charge/discharge voltage range of about 1.4 volts to about 4.5 volts.

17. The positive electrode of claim 1, wherein the carbonaceous material comprises a porous carbon structure.

18. The positive electrode of claim 1, wherein the carbonaceous material comprises carbon nanotubes, carbon nanoparticles, carbon nanofibers, carbon nanosheets, carbon nanorods, carbon nanobelts, graphene, graphene oxide, carbon aerogel, inverse opal carbon, or a combination thereof.

19. The positive electrode of claim 1, wherein an amount of the carbonaceous material is about 50 parts by weight to about 80 parts by weight based on 100 parts by weight of the positive electrode.

20. The positive electrode of claim 1, wherein the lithium salt comprises $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI, $LiB(C_2O_4)_2$, or a combination thereof.

21. The positive electrode of claim 1, wherein an amount of the lithium salt is about 5 parts by weight to about 60 parts by weight based on 100 parts by weight of the positive electrode.

22. The positive electrode of claim 1, wherein the positive electrode is an air electrode.

23. A metal air battery comprising:
a negative electrode comprising lithium or a lithium alloy;
the positive electrode according to claim 1; and
a separator disposed between the negative electrode and the positive electrode.

* * * * *